US009141296B2

(12) United States Patent
Marcu et al.

(10) Patent No.: US 9,141,296 B2
(45) Date of Patent: Sep. 22, 2015

(54) METHOD AND HOST DEVICE FOR PACKING AND DISPATCHING READ AND WRITE COMMANDS

(75) Inventors: Alon Marcu, Tel Mond (IL); Amir Shaharabany, Kochav Yair (IL)

(73) Assignee: SanDisk Technologies Inc., Plano, TX (US)

( * ) Notice: Subject to any disclaimer, the term of this patent is extended or adjusted under 35 U.S.C. 154(b) by 156 days.

(21) Appl. No.: 13/546,528

(22) Filed: Jul. 11, 2012

(65) Prior Publication Data

US 2013/0326141 A1 Dec. 5, 2013

Related U.S. Application Data

(60) Provisional application No. 61/654,030, filed on May 31, 2012, provisional application No. 61/654,031, filed on May 31, 2012.

(51) Int. Cl.
*G06F 12/00* (2006.01)
*G06F 3/06* (2006.01)
*G06F 13/38* (2006.01)

(52) U.S. Cl.
CPC ............ *G06F 3/0613* (2013.01); *G06F 3/0659* (2013.01); *G06F 3/0679* (2013.01); *G06F 13/385* (2013.01); *G06F 2213/3802* (2013.01)

(58) Field of Classification Search
CPC ... G06F 3/0659; G06F 3/0613; G06F 3/0679; G06F 13/385; G06F 2213/3802
USPC ............................... 711/115, 167; 710/35, 39
See application file for complete search history.

(56) References Cited

U.S. PATENT DOCUMENTS

| 6,564,304 | B1 | 5/2003 | Van Hook et al. |
| 7,366,833 | B2 | 4/2008 | Chanda et al. |
| 7,506,075 | B1 | 3/2009 | Armstrong et al. |
| 8,055,816 | B2 | 11/2011 | Asnaashari et al. |
| 8,214,581 | B2 | 7/2012 | Jang et al. |
| 2004/0133754 | A1 | 7/2004 | Zsohar |
| 2006/0143373 | A1* | 6/2006 | Jain et al. ...................... 711/108 |
| 2007/0283086 | A1* | 12/2007 | Bates ............................ 711/113 |
| 2008/0282027 | A1* | 11/2008 | Chen et al. .................... 711/104 |

(Continued)

FOREIGN PATENT DOCUMENTS

WO WO 2009/102821 A2 8/2009

OTHER PUBLICATIONS http://en.wikipedia.org/wiki/Elevator_algorithm, Elevator algorithm, dated May 29, 2012, 3 pages.

(Continued)

*Primary Examiner* — Kalpit Parikh
(74) *Attorney, Agent, or Firm* — Brinks Gilson & Lione

(57) ABSTRACT

A method and host device for packing and dispatching read and write commands are provided. In one embodiment, a host device receives commands from at least one application, wherein the commands include read commands and write commands. The host device stores the commands in the memory. The host device then selects the read commands from the memory and packs them together but separately from the write commands. The same thing is done for the write commands. The host device then sends the packed read commands and the packed write commands to the storage device. In another embodiment, the host device determines when to send the packed commands to the storage device based on at least one parameter.

36 Claims, 4 Drawing Sheets

(56) References Cited

U.S. PATENT DOCUMENTS

2012/0059978 A1    3/2012   Rosenband et al.
2012/0124276 A1    5/2012   Ahn et al.
2012/0311408 A1   12/2012   Nakanishi et al.

OTHER PUBLICATIONS

Application as filed for U.S. Appl. No. 13/764,287 entitled, "Method and Storage Device for Detection of Streaming Data Based on Logged Read/Write Transactions", filed on Feb. 11, 2013, 22 pages.

Kao et al., "High-Performance NAND Flash Controller Exploiting Parallel Out-of-Order Command Execution", *VLSI Design Automation and Test (VLSI-DAT)*, 2010 International Symposium on, IEEE, Piscataway, NJ, USA, Apr. 26, 2010, pp. 160-163.

International Search Report and Written Opinion for PCT/US2013/038465 dated Jul. 9, 2013, 9 pages.

Office Action for U.S. Appl. No. 13/764,287 dated Jan. 13, 2015.

\* cited by examiner

METHOD AND HOST DEVICE FOR PACKING AND DISPATCHING READ AND WRITE COMMANDS

CROSS-REFERENCE TO RELATED APPLICATION

This application claims the benefit of U.S. Provisional Patent Application Nos. 61/654,030 and 61/654,031, both of which were filed on May 31, 2012 and are hereby incorporated by reference herein.

BACKGROUND

Storage devices, such as an embedded multimedia card (eMMC), can be used in consumer electronic devices to store data. While a host device can send a storage device a read or write command as such commands are received from various applications on or external to the host device, such a process can introduce delay. To help reduce such delays, commands can be packed together, but read and write commands may need to be packed separately. If a host device sends commands to the storage device in the order in which they are received from the applications, every time there is a transition from read command to a write command or vice versa, the host device generates a new package of commands. This may result in an inefficient use of the packing mechanism.

OVERVIEW

Embodiments of the present invention are defined by the claims, and nothing in this section should be taken as a limitation on those claims.

By way of introduction, the below embodiments relate to a method and host device for packing and dispatching read and write commands. In one embodiment, a host device receives commands from at least one application, wherein some of the commands are read commands and others of the commands are write commands. The host device stores the commands in the memory. The host device then selects the read commands from the memory and packs them together but separately from the write commands. The same thing is done for the write commands. The host device then sends the packed read commands and the packed write commands to the storage device. In another embodiment, the host device determines when to send the packed commands to the storage device based on at least one parameter. Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Exemplary Host and Storage Devices

Figure 1:
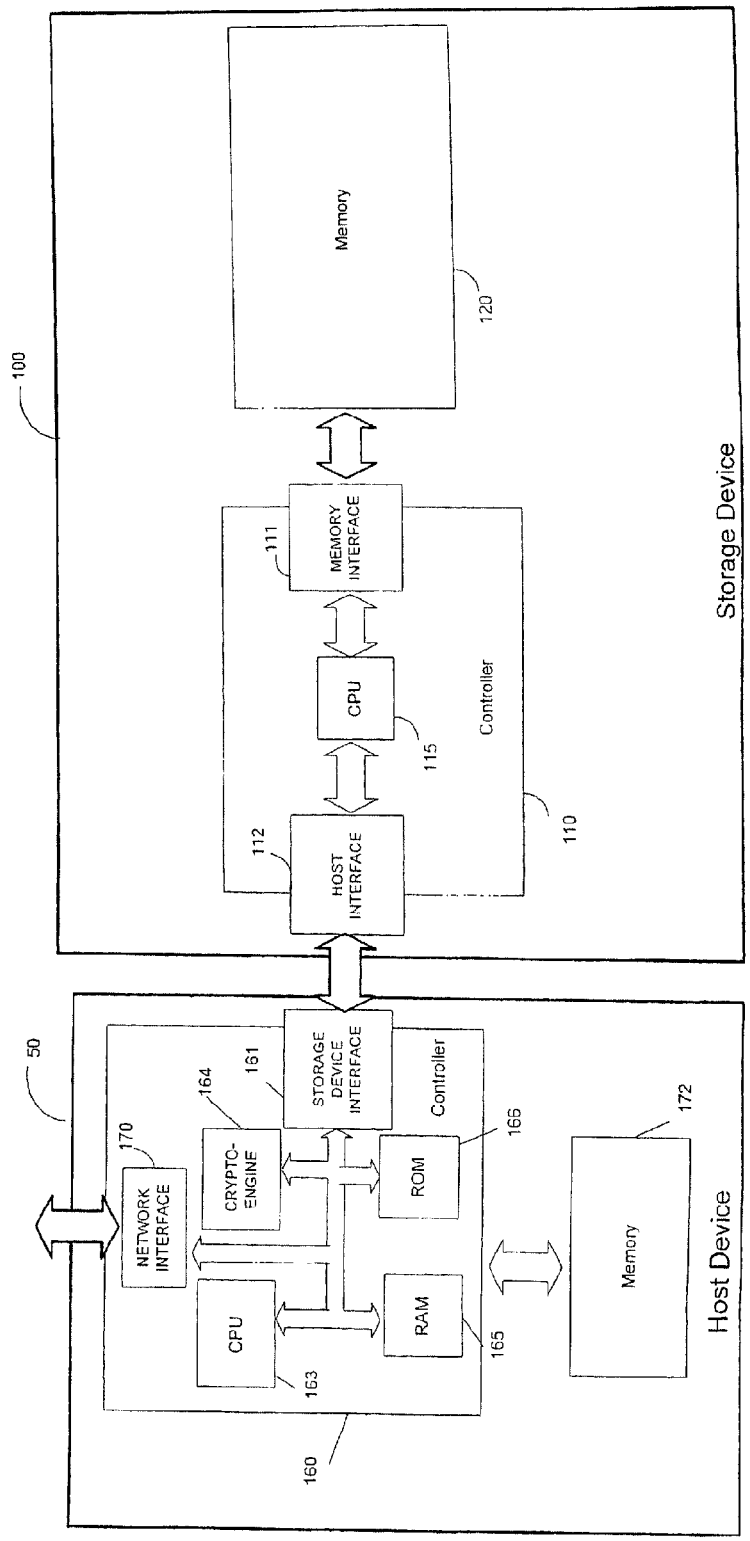
FIG. 1 is a block diagram of an exemplary host device and storage device of an embodiment.

Turning now to the drawings, FIG. 1 is a block diagram of a host device 50 in communication with a storage device 100 of an embodiment. As used herein, the phrase "in communication with" could mean directly in communication with or indirectly in communication with through one or more components, which may or may not be shown or described herein. For example, the host device 50 and storage device 100 can each have mating physical connectors (interfaces) that allow the storage device 100 to be removably connected to the host device 50. The host device 50 can take any suitable form, such as, but not limited to, a mobile phone, a digital media player, a game device, a personal digital assistant (PDA), a personal computer (PC), a kiosk, a set-top box, a TV system, a book reader, or any combination thereof. In this embodiment, the storage device 100 is a mass storage device that can take any suitable form, such as, but not limited to, a handheld, removable memory card (such as a Secure Digital (SD) card or a MultiMedia Card (MMC)), a universal serial bus (USB) device, and a removable or non-removable hard drive (e.g., magnetic disk or solid-state drive). Alternatively, the storage device 100 can take the form of an embedded memory (e.g., a secure module embedded in the host device 50), such as an iNAND™ eSD/eMMC embedded flash drive by SanDisk Corporation. In the below examples, the storage device 100 takes the form of an eMMC device.

As shown in FIG. 1, the storage device 100 comprises a controller 110 and a memory 120. The controller 110 comprises a memory interface 111 for interfacing with the memory 120 and a host interface 112 for interfacing with the host 50. The controller 110 also comprises a central processing unit (CPU) 115. The controller 110 can be implemented in any suitable manner. For example, the controller 110 can take the form of a microprocessor or processor and a computer-readable medium that stores computer-readable program code (e.g., software or firmware) executable by the (micro) processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320. The memory 120 can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used. It should be noted that the storage device 100 shown in FIG. 1 is but one of many possible implementations.

Turning now to the host device 50, the host device 50 comprises a controller 160 that has a storage device interface 161 for interfacing with the storage device 100 and a network interface 170 for interfacing with a network. The network interface 170 can use any suitable technology, such as, but not limited to, a wireless transceiver for wirelessly communicating with the network or a wired connection for a network connector, such as an Ethernet cable. The controller 160 also comprises a central processing unit (CPU) 163, a crypto-engine 164 operative to provide encryption and/or decryption operations, read access memory (RAM) 165, and read only memory (ROM) 166. The storage device 100 also contains a memory 172 for storing, for example, applications (apps) and programs (e.g., a browser, a media player, etc.) used in the operation of the host device 50. The controller's RAM 165 and/or the memory 172 can be used as a buffer for storing commands to be sent to the storage device 100. The host device 50 can contain other components (e.g., a display device, a speaker, a headphone jack, a video output connection, etc.), which are not shown in FIG. 1 to simplify the drawings. Also, other implementations of the host device 50 are possible.

In some environments, the host device 50 is operable to render content stored in the storage device 100. As used herein, "content" can take any suitable form, including, but not limited to, a song, a movie, a game, an application ("app"), a game installer, etc. Depending on the type of content, "render" can mean playing (e.g., when the content is a song or movie), deciphering (e.g., when the content is a game installer), or whatever action is needed to "enjoy" the content. In some embodiments, the host device 50 contains the necessary software to render the content (e.g., a media player), whereas, in other embodiments, such software is provided to the host device 50 by the memory device 100 or another entity.

Brief Overview of the Process of Writing to and Reading from a Storage Device

The process of writing to and reading from a storage device can be generally described as a process involving three different entities: an application, a file system, and a storage device. The application is typically configured to create files, write or read from files, change a file, delete a file etc. The application device is further configured to decide whether to write a large bulk of data (e.g. in a USB side load application, file copy, picture taking, movie recording etc) or to write the same location randomly over and over again (data base application, configuration files which are rapidly changing etc).

The file system is typically configured to perform allocation and de-allocation of memory, and all the bookkeeping associated. For that purpose the file system may manage a number of tables, such as tables of allocated and de-allocated memory addresses, tables of creation time of files, change time of files, deletion time of files etc. Other tables (not mentioned here) may also be managed by the file system. Typically, these tables are internal to the file system and are not reported to other devices (such as the application device or the storage device).

Figure 2:
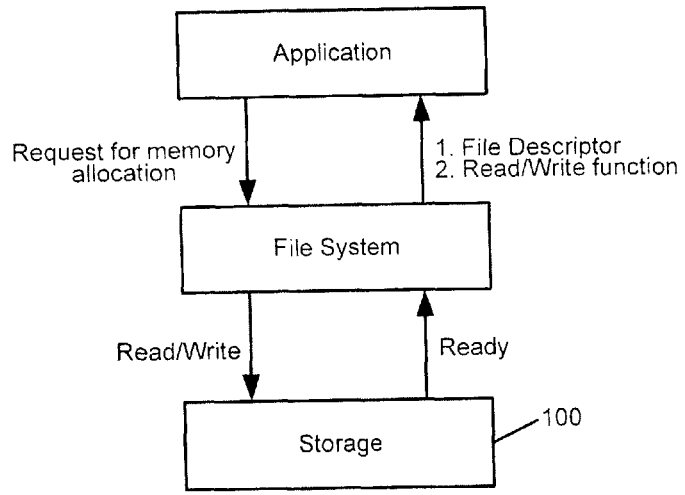
FIG. 2 is a block diagram showing interaction between an application, file system, and storage device of an embodiment.

The storage device is typically configured to perform the physical writing of the data into a physical memory array (preferably a non-volatile memory). Typically, the storage device will perform a mapping of the logical addresses which were communicated by the file system into physical addresses of memory. However, in some implementations some of the functionalities of the file system are implemented inside the storage device. The storage device is also configured to determine the operational parameters which will be associated with data which is stored in the memory, or data which is to be stored to the memory. Typical parameters include parameters related to the amount of data that is to be read/written in one command, and parameters related to a data cleanup and management procedures, sometimes referred to as Garbage Collection (GB). Other parameters which may be managed by the storage device are related to error protection, where a partial list of parameters includes parameters related to a type of encoding to be used (e.g. parameters related to the type of code, where two popular types of codes are DPC and BCH), parameters related to a length of codewords, amount of parity bits, parameters related to interleaving of the codewords, and parameters related to decoding (e.g. hard decoding, vs. soft decoding, number of soft bits to be read for decoding, number of iterations etc.). Typically prior art systems determine the storage parameters by classifying the data into one of 2 classes of data: Sequential data, and Random data. A detailed description of Sequential data and Random data is provided herein, after describing the relationship and interface between the application, file system and storage devices. This relationship may be implemented by a system comprised of 3 devices with a bi-directional communication as depicted in FIG. 2.

Figure 3:
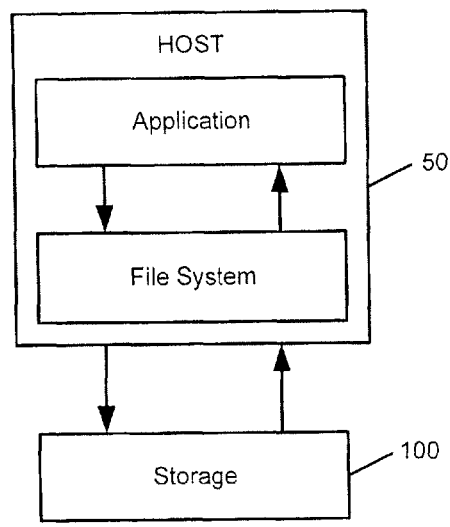
FIG. 3 is a block diagram showing an arrangement of an application, file system, and storage device of an embodiment.

The application is configured to send communication signals to the file system device requesting an allocation of new memory for writing new data or a request to de-allocate previously allocated memory for deleting existing data stored in the memory. The application device is also configured to receive from the file system a communication signal approving or denying the application's request. In case of approval, the communication signals from the file system will typically comprise of a file descriptor (pointer), and a function through which the application may read/write. The file system is typically configured to receive requests from the application to allocate a certain amount of memory or to de-allocate memory which was previously allocated. The file system determines whether there is available memory to fulfill the application's request. If it determines that there is available memory the file system will update the memory bookkeeping tables (internally in the file system) and send a communication back to the application. The communication will comprise a file descriptor, which is a pointer to which the application can relate while writing the file, and a function through which the application can write. The application may then write the file as if it is writing to a temporary volatile memory such as a RAM (which is usually the case). Typically the file system tries to allocate a contiguous block of memory because the performance will be better when a file is spread along a minimum number of fragments. In case the file system can find a contiguous block of memory which is sufficient it will allocate it for the application, but if the file system cannot find a contiguous block, (e.g. due to fragmentation), then it will allocate few fragments which overall suffice to meet the size requested by the application. The file system is also typically configured to send read/write commands to the storage device. A typical write command will comprise of a small header defining the type of the command, ('write'), followed by the data to be written to memory. The storage device is configured to perform the actual writing to the physical memory (not depicted) and report to the file system when it is ready to receive a new command. Typically this is the only communication signal sent from the storage device to the file system device. All the other functions mentioned above are done at the storage device in an independent manner, without communicating to the file system. However, implementations where the storage communicates one or more of the parameters to the file system may also be considered. Since the focus of the present disclosure are the parameters managed by the storage device, and associated with the sequential and random data stored (or to be stored) in the memory, the model that will be referred to in the sequel is the model depicted in FIG. 3 comprising of a host device and a storage device, where the host device itself comprises an application and a file system.

With the exemplary host and storage devices now explained, as well as the process of writing to and reading from a storage device, the following sections provide a brief overview of packing commands, followed by a detailed discussion of embodiments related to sequencing packed commands and to sequencing a packed command.

Brief Overview of Packed Commands

The typical method for storing data in a storage device, where the storage device is included in a system having the storage device and a host device, is as follows:

The host device issues read/write command and sends to the storage device.

The storage device receives the command.

The storage device sends an acknowledgement signal ('ack') to the host device (optional).

The storage device performs the read/write command, and when the command is complete, the storage device sends to the host device a 'release' message to release all resources related to the command and issue a new command.

The host device receives 'release' message and is free to issue a new command.

The host device issues a new read/write command and sends it to the storage device.

The storage device receives the new command.

Figure 4:
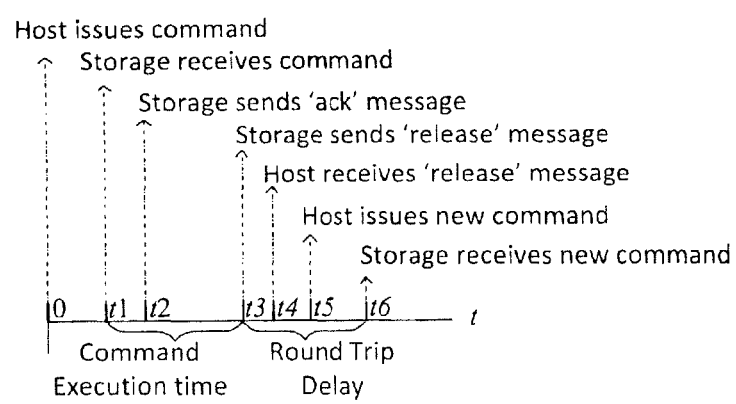
FIG. 4 is timeline of a packed commands process usable with an embodiment.

The timeline for this process is illustrated in FIG. 4. The elapsed time between sending the 'release' message by the storage device (at t=t3) and receiving the following new command (at t=t6), is called the round trip delay. The round trip delay may cause degradation in the system performance, especially for modern high performance storage systems where the round trip delay duration is not negligible relative to the duration of the execution time of the read/write commands. The timeline of the figure is just a general scheme and does not necessarily reflect the actual ratios between the various points. The execution time of the command (between t1 and t3) is shown to be rather long, since in an optimal system, all the other times are overhead times which need to be reduced. In an optimal system, the round trip delay should be much shorter than the command execution time.

Variants of this process may include a process where the storage only sends 'release' messages, but does not send 'ack' messages.

In order to improve system performance and minimize the round trip delay effect, some standards, such the Serial Advanced Technology Attachment (SATA) standard, have defined a format of a multi-command. According to this standard, up to 32 read/write commands may be issued prior to receiving a 'release' message. The host may manage a counter counting how many commands are waiting in the queue. For each new command issued by the host, the command counter is incremented, and for each 'release' message received from the storage device, the counter is decremented. As long as the counter is within the allowed range (0-32 in the example given), new commands may be issued. When the counter is at the maximal value (e.g. 32), no new commands may be issued until a 'release' message is received. The SATA storage device may execute the commands received from the host in any order. Thus, the storage device may choose to implement an intelligent algorithm for optimizing the storage performance. On the other hand, the host device may implement a very simple scheduling method. Whenever a request for a command is received, the host device may send it without waiting for other commands to be received and without implementing any optimization algorithm. The optimization can be done by the storage device 100.

Structure of Read/Write Commands in eMMC

As mentioned above, in one embodiment, the storage device 100 is an embedded multimedia card (eMMC). A MultiMediaCard (MMC) is a flash memory card standard based on NAND-based flash memory, has the size of about 24 mm×32 mm×1.4 mm, can currently allow transfers of 1, 4, or 8 bits at a time. eMMC describes an architecture consisting of an embedded storage solution with MMC interface, flash memory and controller, all in a small ball grid array (BGA) package. Implementations of the eMMC standard typically cannot use the multi-command format described above, since the eMMC is built on an existing state machine, which does not support queuing of read/write commands and execution of the commands in a different order than issued. However, modern flash based systems have higher read/write performance than legacy flash systems and, therefore, may suffer from performance degradation due to a large round-trip delay. A different approach has to be taken, if one is interested to find a solution which is compatible with the existing state machine and command structure of eMMC.

Figure 5:
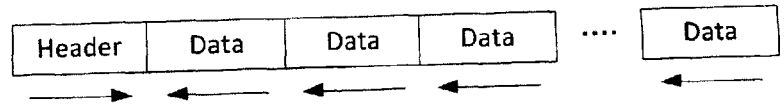
FIG. 5 is an illustration of a read command usable with an embodiment.

A typical read command compatible with eMMC has a structure, which is illustrated in FIG. 5. The command header is comprised of meta data related to the read command, such as (logical) memory address of data (or part of the data), length of the read command, etc. The header is issued by the host and transmitted to the storage device, and this is depicted in the figure by a right pointing arrow, (→). The header is followed by data which are transmitted from the storage device to the host, and depicted by a left pointing arrow, (←). There may be a time delay between the transmission of the header from the host to the storage until the storage begins transmitting the required data to the host. This delay may be caused, among other reasons, by a need to process the header by the storage prior to being able to fulfill the host's command.

Figure 6:
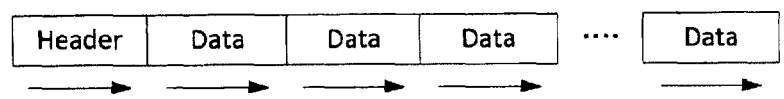
FIG. 6 is an illustration of a write command usable with an embodiment.
Figure 7:
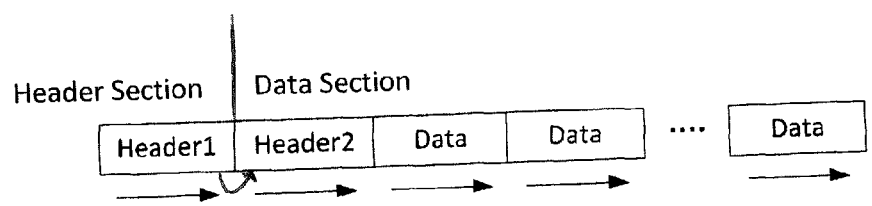
FIG. 7 is an illustration of a packed write command usable with an embodiment.

A typical write command compatible with eMMC has a structure illustrated in the FIG. 6. The write command is very similar to the read command except for the fact that the direction of both header and data sections are from the host to the storage. In order to boost performance, and still be compliant with the eMMC standard larger read and write commands were defined. These commands are known as 'packed commands', and allow for a larger header and a larger number of data sector to be delivered on each command. The header of a packed command may be larger than the maximal header of an eMMC command. To overcome this and still provide compatibility, the form shown in FIG. 7 can be used for a packed write command Part of the header is written in its original location as defined by the standard, while the rest of the header of the packed command is embedded in the data part of the command. The first part of the header comprises information designating that the command is a packed command together with other information on the location of the full header of the command. Two sectors are depicted in the figure by way of example. The storage device detects from the first section of the header that the command is a packed command and looks for all other header information associated with the command in the corresponding addresses of the data. After processing all the header information, the storage device may proceed to complete the (long) packed write command, which has less overhead associated than if it were issued as a series of legacy write commands.

Packing a read command is slightly more complex, since the legacy read command changes the transmission direction after receiving the legacy header, which is limited in its length. Therefore, packed read commands are typically implemented as a series of two commands, the first command is a short write command comprised of a legacy header section followed by a small number of data sections. The header of the command contains information for informing the storage device that the command is part of a packed read command, while the data sections of the command contain additional header information associated with the packed read command.

Figure 8:
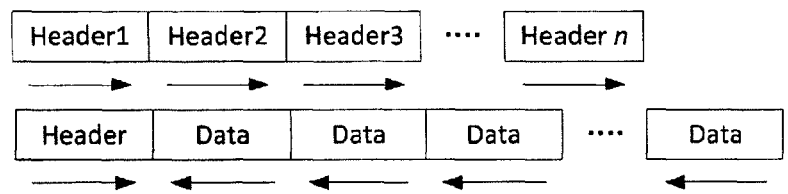
FIG. 8 is an illustration of a packed read command usable with an embodiment.

The write command is followed by a packed read command, which has the format of a legacy read command with the important difference that its data section may be much longer. A packed read command is depicted in FIG. 8. The first command has the format of a legacy write command (typically containing only 2 header sections), where the section denoted by Header1 occupies the header portion of the legacy write command, and the other data sections are occupied header information associated with the packed read command.

The second command is in the format of a legacy read command, but with a longer data section.

Packed commands allow for a better performance of storage systems using the eMMC standard. However, the following embodiments can be used to provide more optimal parameters for packing.

Embodiments Related to Sequencing Packed Commands

Due to their different structure, read and write commands are not packed together. Therefore, packed commands are typically either read or write, but not a mixture of the two types. In many cases, the distribution of read and write commands is not the same. For example, in some applications, read commands may occupy over 70% of the data while write commands are less than 30%. Other applications may include short read and write commands, which are issued in a sequence of read, write, read, write, read, write, etc. If the commands are sent in the order they were issued, every time there is a transition from read to write or vice versa, the host does not pack any more commands into the current packed command and closes the command currently under processing and send to the storage. This may result in an inefficient use of the packing mechanism, wherein the packed commands will be shorter than optimal.

The present embodiment overcomes this drawback and provides novel methods for sequencing packed commands in an eMMC environment. This can be done by defining a "double track" for packed commands. According to one embodiment, a method for operating a memory system comprises packing read commands in parallel to packing write commands. Whenever a sequence of commands is issued by applications internal or external to the host, the commands are stored in a buffer memory in the host device instead of being issued to the storage device in the order in which they were received. The host can then select the read commands from the memory and pack them alone and, similarly, select the write commands and pack them alone. Each of the read and write packed commands are sent to the storage device independently according to the host decision. In the storage device the internal order of the read commands, as well as the order of the write commands, can be maintained. In some cases, the host may create multiple packed commands, where each packed command contains only read or write commands, but the read (or write) commands themselves will be packed into different packed commands. For example, the read commands may be partitioned according to a priority parameter, where higher priority commands are packed into one command and lower priority commands are packed into a second command. The priority may be assigned by the application, or it may be determined by the host according to the destination of the command. Other criteria may also be determined by the host. The priority assigned to a command may also affect other characteristics of the packed command. For example, a packed command including high priority commands can be limited (e.g., in terms of total length or number of constituent commands) to a lower number than packed command that do not include high priority commands.

The methods of the present embodiment can be applied to read and write commands that can be performed independently (as determined by the host or the application). Read and write commands that are dependent (such as a write command followed by a read command verifying that the write command was performed) preferably are not packed according to the present method but rather will stop the packing process and be sent in the specific order they were issued. When other read write commands are issued that are independent of one another, they can be packed according to the present embodiment. Packing may also be stopped in case of a 'flush' request received by the host from the application. In this case, packing will stop and will resume only after all commands in the queue are completed.

Embodiments Related to Dispatching a Packed Command

The parameters used in association with packed commands may significantly influence the system performance and the user experience. (The packed commands in this embodiment can be commands that are packed as they are received or commands that are stored in host memory and later packaged together, as discussed in the prior embodiment.) For example, when a user uses a flash system to download data from an internet application, a music player, or video camera, if read and write commands will be sent un-packed (i.e., legacy commands), then the round trip delay may occupy a significant part of the total time of download, thus degrading the system performance and the user experience. On the other hand, if commands will be packed in large numbers, it may result in a long response time between the initiating a command until a response is initiated, and this may also degrade the user experience and, in some cases, also degrade system performance.

According to the present embodiment, the host device 50 can send a packed command to the storage device as a function of various parameters, include some or all of the following (these are just examples and other parameters can be used):

1. Time delay between commands
2. System load
3. Buffer status (i.e., capacity of the host memory)

For example, if the system is heavily loaded, then there is no need to send a command since there is already inherent latency in the system. Sending many short commands will add to the total round trip delay; thus, degrading performance without any improvement in the user experience. On the other hand, if the load is light, sending commands as early as possible will improve user experience by providing faster response, and the additional round trip delay will not adversely affect the system since there is idle time anyhow between commands. However, even when the load is high, a maximal time between consecutive commands may optionally be defined, such that the system will send a packed command if the time elapsed since the last command exceeds a predefined time-length. Also if the load on the host buffers exceeds a predefined parameter, then a command can be sent regardless of the other parameters. Optionally, a different combination of the parameters may also trigger sending of a packed command. The effect of the parameters (e.g., time delay between commands, system load, host capacity) may be different for read commands than for write commands. It may also be different as a function of the characteristics of the commands included in the packed command (such as the priority of the constituent commands).

Conclusion

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A host device comprising:
   a storage device interface through which the host device can communicate with a storage device;
   a memory; and
   a controller in communication with storage device interface and the memory, wherein the controller is configured to:
   receive commands from at least one application, wherein the commands include read commands and write commands;
   store the commands in the memory;
   select the read commands from the memory and pack them together but separately from the write commands;
   select the write commands from the memory and pack them together but separately from the read commands; and
   send the packed read commands and the packed write commands to the storage device;
   wherein the packed read and write commands each comprise respective header and data sections, wherein a first part of header information of each command is stored in the header section of that command and a second part of the header information of each command is stored in the data section of that command, and wherein the first part of the header information of each command contains information identifying a location in the data section of that command that contains the second part of the header information.

2. The host device of claim 1, wherein the storage device is an embedded multimedia card (eMMC).

3. The host device of claim 1, wherein the at least one application is internal to the host device.

4. The host device of claim 1, wherein the at least one application is external to the host device.

5. The host device of claim 1, wherein the controller is further configured to maintain an order in which the commands were received from the at least one application.

6. The host device of claim 1, wherein the read and write commands are performable independently.

7. The host device of claim 1, wherein the controller is further configured to stop packing commands if it detects a read command that is dependent on a write command, or vice versa.

8. The host device of claim 1, wherein the controller is further configured to determine when to send the packed commands to the storage device based on at least one parameter.

9. The host device of claim 8, wherein the at least one parameter comprises a time delay between commands.

10. The host device of claim 8, wherein the at least one parameter comprises system load.

11. The host device of claim 8, wherein the at least one parameter comprises capacity of the memory.

12. The host device of claim 1, wherein at least one command in the packed command is itself a packed command.

13. The host device of claim 12, wherein the at least one command are a plurality of read commands, wherein where higher priority commands are packed into one command and lower priority commands are packed into a second command.

14. The host device of claim 1, wherein the controller is figured configured to stop packing commands in response to receiving a flush request.

15. The host device of claim 1, wherein the controller is figured configured to determine when to send the packed commands to the storage device based on at least one parameter.

16. The host device of claim 15, wherein the at least one parameter comprises a time delay between commands.

17. The host device of claim 15, wherein the at least one parameter comprises system load.

18. The host device of claim 15, wherein the at least one parameter comprises capacity of the memory.

19. A method for packing read and write commands, the method comprising:
   performing the following in a host device in communication with a storage device:
   receiving commands from at least one application, wherein the commands include read commands and write commands;
   storing the commands in the memory; and
   selecting the read commands from the memory and packing them together but separately from the write commands;
   selecting the write commands from the memory and packing them together but separately from the read commands;
   sending the packed read commands and the packed write commands to the storage device;
   wherein the packed read and write commands each comprise respective header and data sections, wherein a first part of header information of each command is stored in the header section of that command and a second part of the header information of each command is stored in the data section of that command, and wherein the first part of the header information of each command contains information identifying a location in the data section of that command that contains the second part of the header information.

20. The method of claim 19, wherein the storage device is an embedded multimedia card (eMMC).

21. The method of claim 19, wherein the at least one application is internal to the host device.

22. The method of claim 19, wherein the at least application is external to the host device.

23. The method of claim 19 further comprising maintaining an order in which the commands were received from the at least one application.

24. The method of claim 19, wherein the read and write commands are performable independently.

25. The method of claim 19 further comprising stopping packing commands if a read command dependent on a write command is detected, or vice versa.

26. The method of claim 19 further comprising determining when to send the packed commands to the storage device based on at least one parameter.

27. The method of claim 26, wherein the at least one parameter comprises a time delay between commands.

28. The method of claim 26, wherein the at least one parameter comprises system load.

29. The method of claim 26, wherein the at least one parameter comprises capacity of the memory.

30. The method of claim 19, wherein at least one command in the packed command is itself a packed command.

31. The method of claim 30, wherein the at least one command are a plurality of read commands, wherein where higher priority commands are packed into one command and lower priority commands are packed into a second command.

32. The method of claim 19 further comprising stopping packing commands in response to receiving a flush request.

33. The method of claim 19 further comprising determining when to send the packed commands to the storage device based on at least one parameter.

34. The method of claim 33, wherein the at least one parameter comprises a time delay between commands.

35. The method of claim 33, wherein the at least one parameter comprises system load.

36. The method of claim 33, wherein the at least one parameter comprises capacity of the memory.

* * * * *